US 9,648,032 B2

(12) United States Patent
Davydov et al.

(10) Patent No.: US 9,648,032 B2
(45) Date of Patent: May 9, 2017

(54) SYSTEM AND METHOD FOR BLOCKING EXECUTION OF SCRIPTS (71) Applicant: AO Kaspersky Lab, Moscow (RU)

(72) Inventors: Vasily A. Davydov, Moscow (RU); Anton M. Ivanov, Moscow (RU); Roman Y. Gavrilchenko, Moscow (RU); Dmitry V. Vinogradov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 15/062,455

(22) Filed: Mar. 7, 2016

(65) Prior Publication Data
US 2017/0093893 A1 Mar. 30, 2017

(30) Foreign Application Priority Data
Sep. 30, 2015 (RU) .................................. 2015141537

(51) Int. Cl.
*G06F 21/56* (2013.01)
*H04L 29/06* (2006.01)

(52) U.S. Cl.
CPC ...... *H04L 63/1416* (2013.01); *H04L 63/1425* (2013.01)

(58) Field of Classification Search
CPC .................................. H04L 63/14; G06F 21/56
See application file for complete search history.

(56) References Cited

U.S. PATENT DOCUMENTS

| 7,801,840 | B2 * | 9/2010 | Repasi | G06F 21/55 706/52 |
| 8,037,535 | B2 * | 10/2011 | Maloof | G06F 21/562 713/188 |
| 8,056,136 | B1 * | 11/2011 | Zaitsev | G06F 21/56 726/24 |
| 8,584,235 | B2 * | 11/2013 | Topan | G06F 21/563 713/179 |
| 9,118,703 | B2 | 8/2015 | Topan et al. | |
| 9,148,441 | B1 * | 9/2015 | Tamersoy | H04L 63/1416 |

(Continued)

FOREIGN PATENT DOCUMENTS

EP      1986120 A1      10/2008

OTHER PUBLICATIONS

European Search Report for EP 16 16 3006, dated Feb. 16, 2017.

*Primary Examiner* — William Powers
(74) *Attorney, Agent, or Firm* — Arent Fox LLP; Michael Fainberg (57) ABSTRACT Disclosed are exemplary aspects of systems and methods for blocking execution of scripts. An exemplary method comprises: intercepting a request for a script from a client to a server; generating a bytecode of the intercepted script; computing a hash sum of the generated bytecode; determining a degree of similarity between the hash sum of the bytecode and a plurality of hash sums of malicious and clean scripts stored in a database; identifying a similar hash sum from the database whose degree of similarity with the hash sum of the bytecode is within a threshold of similarity; determining a coefficient of trust of the similar hash sum; determining whether the requested script is malicious based on the degree of similarity and the coefficient of trust of the similar hash sum; and blocking the execution of the malicious script on the client.

15 Claims, 3 Drawing Sheets (56) References Cited

U.S. PATENT DOCUMENTS

| | | | |
|---|---|---|---|
| 9,300,682 B2* | 3/2016 | Burnham | H04L 63/1441 |
| 2005/0172338 A1 | 8/2005 | Sandu et al. | |
| 2010/0205297 A1* | 8/2010 | Sarathy | H04L 12/2602 |
| | | | 709/224 |
| 2010/0235285 A1* | 9/2010 | Hoffberg | G06Q 20/401 |
| | | | 705/75 |
| 2011/0283356 A1* | 11/2011 | Fly | G06F 21/577 |
| | | | 726/22 |
| 2012/0110174 A1* | 5/2012 | Wootton | G06F 21/564 |
| | | | 709/224 |
| 2015/0047034 A1* | 2/2015 | Burnham | H04L 63/1441 |
| | | | 726/23 |
| 2015/0096023 A1 | 4/2015 | Mesdaq et al. | |
| 2016/0036834 A1* | 2/2016 | Filatov | H04L 63/1408 |
| | | | 726/22 |

\* cited by examiner

SYSTEM AND METHOD FOR BLOCKING EXECUTION OF SCRIPTS

CROSS-REFERENCE TO RELATED APPLICATIONS

The present disclosure claims benefit of priority under 35 U.S.C. 119(a)-(d) to a Russian Application No. 2015141537 filed on Sep. 30, 2015, which is incorporated by reference herein.

FIELD OF TECHNOLOGY

The present invention relates generally to the field of computer security, and, more specifically to systems and methods for blocking the execution of scripts.

BACKGROUND

The vigorous development of computer and information technologies has led to extensive use of e-commerce, electronic document transfer, cloud storage and other computer technologies by users in their daily lives. For example, a substantial number of users are storing their personal and confidential information on computers, and the overwhelming majority of businesses are conducting their financial and commercial activity via electronic devices and services.

The widespread use of the described computer technologies has in turn given rise to an increased number of instances of their use for hacking. A large number of different malicious programs (also known as malware) have appeared, and the number of computer systems affected by them has grown significantly. Some malicious programs steal the personal and confidential data of users from computer systems (such as logins and passwords, banking information, electronic documents), others form so-called botnets from the infected computer systems, and still others impose paid services on users.

Many different security technologies are used to protect computers against malicious programs—antivirus programs, firewalls, intrusion detection systems (IDS) and so on, which are able to both effectively detect malicious programs and remove them. While the effective repair of a computer infected by a malicious program is more important to the users, for companies it is high operating efficiency and effectiveness in detecting attempts to infect computer systems.

The majority of existing security solutions are aimed primarily at detecting and removing malware whose behavior or structure are already known. Therefore, when a computer system finds itself attacked by a new, unknown or obfuscated malware (specifically, malicious scripts), the existing security solutions become ineffective. Furthermore, the tasks of detecting infected computer systems with compound malicious programs (specifically, malicious scripts), which are made up of several files, not every one of which carries the malicious functionality, also present great difficulty to the known security solutions.

SUMMARY

Disclosed are exemplary aspects of systems and methods for blocking execution of malicious scripts. An exemplary method comprises: intercepting, by a hardware processor, a request for a script from a client to a server; generating, by the hardware processor, a bytecode of the intercepted script; computing, by the hardware processor, a hash sum of the generated bytecode; determining, by the hardware processor, a degree of similarity between the hash sum of the bytecode and a plurality of hash sums of malicious and clean scripts stored in a database; identifying, by the hardware processor, a similar hash sum from the database whose degree of similarity with the hash sum of the bytecode is within a threshold of similarity; determining, by the hardware processor, a coefficient of trust of the similar hash sum; determining, by the hardware processor, whether the requested script is malicious based on the degree of similarity and the coefficient of trust of the similar hash sum; and blocking, by the hardware processor, the execution of the malicious script on the client.

In one exemplary aspect, intercepting a request for a script includes: providing, on the client, a driver configured to intercept network script requests.

In one exemplary aspect, the bytecode includes at least one opcode of the script.

In one exemplary aspect, generating a bytecode of the script includes: identifying, by the hardware processor, script commands responsible for functions of writing of data to disk, working with objects of file system and execution of programs; grouping, by the hardware processor, the identified script commands into a plurality of functional groups based on their identified functions; assigning, by the hardware processor, a binary value to each functional group; and generating, by the hardware processor, the bytecode from the binary values.

In one exemplary aspect, a hash sum includes a fuzzy hash.

In one exemplary aspect, searching for matching hash sums includes fuzzy searching.

An exemplary system for blocking execution of malicious scripts comprises: a hardware processor configured to: intercept a request for a script from a client to a server; generate a bytecode of the intercepted script; compute a hash sum of the generated bytecode; determine a degree of similarity between the hash sum of the bytecode and a plurality of hash sums of malicious and clean scripts stored in a database; identify a similar hash sum from the database whose degree of similarity with the hash sum of the bytecode is within a threshold of similarity; determine a coefficient of trust of the similar hash sum; determine whether the requested script is malicious based on the degree of similarity and the coefficient of trust of the similar hash sum; and block the execution of the malicious script on the client.

An exemplary non-transitory computer readable medium storing computer executable instructions for blocking execution of malicious scripts, including instructions for: intercepting a request for a script from a client to a server; generating a bytecode of the intercepted script; computing a hash sum of the generated bytecode; determining a degree of similarity between the hash sum of the bytecode and a plurality of hash sums of malicious and clean scripts stored in a database; identifying a similar hash sum from the database whose degree of similarity with the hash sum of the bytecode is within a threshold of similarity; determining a coefficient of trust of the similar hash sum; determining whether the requested script is malicious based on the degree of similarity and the coefficient of trust of the similar hash sum; and blocking the execution of the malicious script on the client.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the present invention include the features described and particularly pointed out in the claims.

BRIEF DESCRIPTION OF THE DRAWINGS

The accompanying drawings, which are incorporated into and constitute a part of this specification, illustrate one or more example aspects of the present invention and, together with the detailed description, serve to explain their principles and implementations.

DETAILED DESCRIPTION OF EXEMPLARY ASPECTS

Example aspects of the present invention are described herein in the context of a system, method, and computer program product for blocking execution of malicious scripts. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Some definitions and concepts used in the following description will be introduced first.

A malicious script may be a script able to cause harm to a computer or to the data of the computer user. The harm caused may be, for example, unauthorized access to computer resources, including data being stored on the computer, for purposes of theft, and also unauthorized use of resources, including to store data, perform calculations, and so on.

A trusted script may be a script that does not cause harm to the computer or its user. A trusted script can be considered to be a script developed by a trusted software manufacturer, downloaded from a trusted source (such as a site entered in the library of trusted sites), or a script whose identifier (such as the MD5 of the script file) is stored in a library of trusted scripts. The identifier of the manufacturer, such as a digital certificate, can also be stored in the library of trusted scripts.

Figure 1:
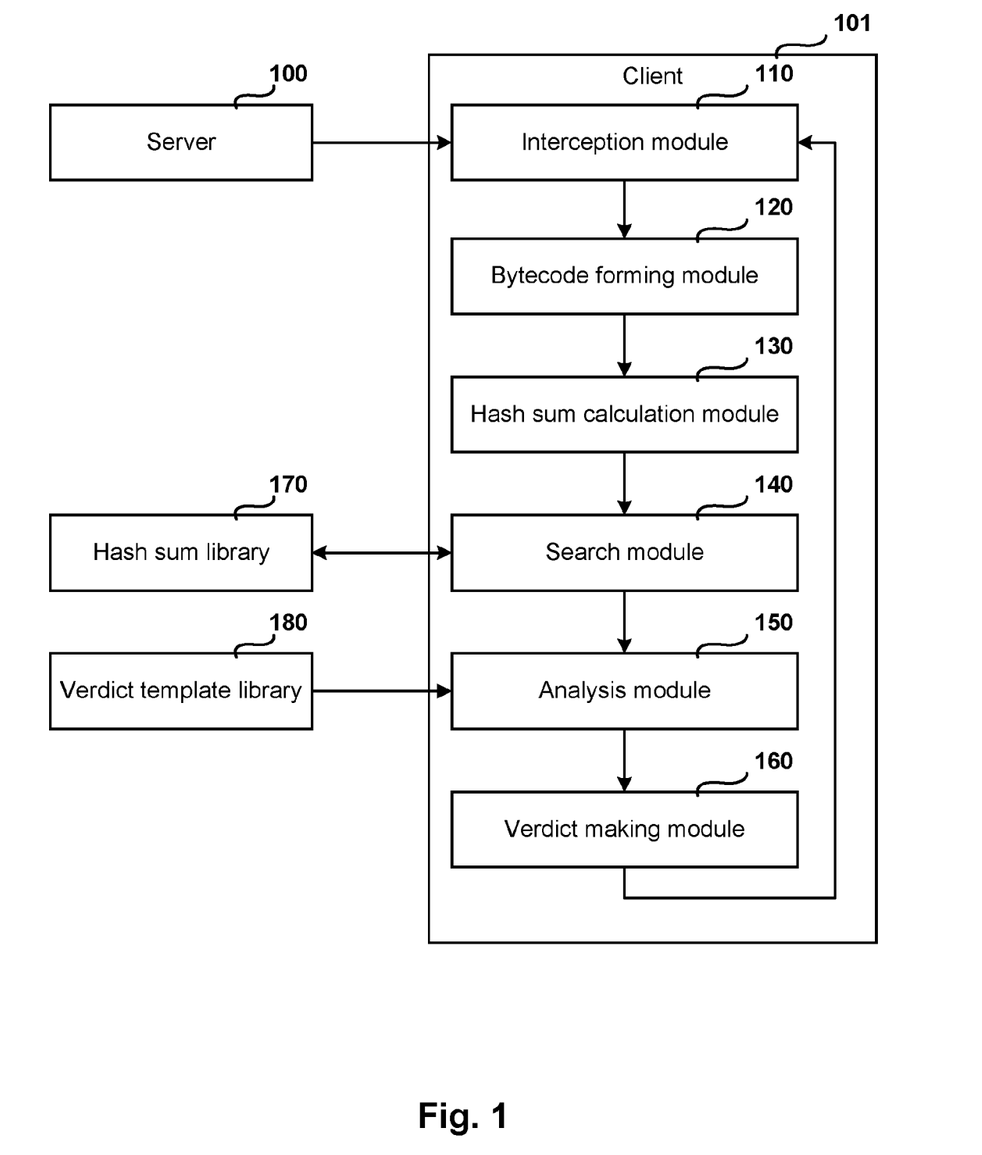
FIG. 1 illustrates a diagram of an exemplary system for blocking execution of scripts.

FIG. 1 shows a diagram of an exemplary system for blocking the execution of malicious scripts requested by a client (a component of the client-server architecture) from a server. The system includes a server 100, a client 101, an interception module 110, a bytecode calculating module 120, a hash sum calculating module 130, a search module 140, an analysis module 150, a verdict making module 160, a hash sum library 170 and a verdict template library 180.

In one exemplary aspect, the server 100 can be at least a web server, containing Internet pages; or a file server, containing scripts. In various exemplary aspects, the scripts may include, but not limited to: programs written in script languages, such as JavaScript, VBscript and so on; programs written in VBA language (Visual Basic for Applications) and placed in electronic MS Office documents and so on; programs written in Java language; programs written in ActionScript language. The scripts can be transferred from the server 100 to the client 101 in the form of an Internet page containing JavaScript code, VBScript, etc., being transmitted by network from the Internet site to the client's browser, or in the form of files (such as MS Office documents containing VBA code), being transmitted with the aid of API functions from a file manager to an application (such as MS Office) working with the files.

In one exemplary aspect, the interception module 110 may be configured to: intercept a script requested by the client 101 from the server 100, transmit the intercepted script to the bytecode calculating module 120, and block the execution of the intercepted script when the verdict making module 160 pronounces a decision that the intercepted script is malicious.

In one exemplary aspect, the intercepting of scripts being transmitted from the server 100 to the client 101 may be done using a driver specially developed for this purpose and consists in rerouting the transmission channel of the script (for example, by changing the address of the source receiving the data) from the client 101 to the driver. Thus, the script requested by the client 101 and being transmitted by the server 100 will end up at the driver, and not at the client. For example, a driver intercepting a call for API functions of the operating system recv, which is responsible for receiving data being transmitted through the network, is able to receive all incoming network traffic. In various exemplary aspects, blocking the execution of the script may include, but not limited to: preventing the running of the intercepted script by intercepting the call for the corresponding API functions; replacing the script intended for execution with a previously prepared trusted script; transmitting previously prepared data in place of that requested by the script being launched.

In one exemplary aspect, the bytecode calculating module 120 may be configured to calculate the bytecode of the intercepted script. The bytecode may constitute a set of script commands (opcode) consisting of at least one command contained in the intercepted script. The bytecode calculating module 120 then transmits the bytecode to the hash sum calculating module 130.

In one exemplary aspect, the bytecode of the intercepted script may be formed as follows: a sequence of all script commands is selected from the script; some of the script commands not realizing the previously specified functionality (such as writing data to a disk, working with objects of the file system, running applications, and so forth) are removed from the selected sequence; the script commands remaining in the selected sequence are combined into groups of commands containing at least one script command each (for example, a sequence of script commands responsible for writing data to a file, running a file and deleting a file can be combined into one group); each script command or group of script commands is assigned a unique two-byte value; the obtained sequence of two-byte values constitutes the calculated bytecode.

In one exemplary aspect, the hash sum calculating module 130 may be configured to calculate the hash sum of the calculated bytecode and transmit the calculated hash sum to the search module 140. The hash sums of the bytecode may be calculated by: calculating fuzzy hash sums, where the fuzzy hash sum of data constitutes a set of hash sums calculated from different data regions for which a fuzzy hash sum is calculated; and fuzzy searching, which is a technique of finding an element in a set with the use of data structures (elements of Euclidean space, tree space, and so on), making possible a rapid search for the element of the set nearest to the element being searched, with a small number of comparisons in any given spaces.

In one exemplary aspect, the search module 140 may be configured to: select from the hash sum library 170 at least one group in which at least one hash sum has a degree of similarity to the hash sum calculated by the hash sum calculating module 130 that corresponds to a previously established similarity threshold; and transmit the at least one selected group and the determined degree of similarity to the analysis module 150. The degree of similarity of the hash sums being compared may be a numerical value characterizing how similar the compared hash sums are to each other, determined by the method of comparing hash sums.

The degree of similarity of hash sums may be calculated at least by: comparing fuzzy hash sums, namely calculating a numerical value characterizing the similarity of the data for which the hash sums were computed; calculating fuzzy searching metrics, namely calculating the distance between the sought and found elements of a set being searched.

In one exemplary aspect, the analysis module 150 may be configured to: select from the verdict template library 180 at least one verdict template including at least one group whose degree of similarity to at least one group selected by the search module 140 corresponds to a previously established threshold, where the verdict template constitutes a set of data including at least one group from the hash sum library 170; a verdict template trust coefficient, being a numerical value; and transmit the verdict template trust coefficient from the selected verdict template and the calculated degree of similarity to the verdict making module 160.

In one exemplary aspect, the verdict template trust coefficient may be a numerical value from 0, signifying that all the scripts used to obtain the groups contained in the given verdict template are malicious, to 1, signifying that all the scripts used to obtain the groups contained in the given verdict template are trusted.

In one exemplary aspect, the degree of similarity of the groups may be calculated at least by: finding the scalar product of multidimensional vectors, where the elements of the multidimensional vectors are the data included in the groups; and calculating the fuzzy searching metrics.

In one exemplary aspect, the verdict making module 160 is configured to: make a decision as to whether the script intercepted by the interception module 110 is malicious on the basis of at least one verdict template trust coefficient obtained from the analysis module 150 and at least one degree of similarity of hash sums obtained from the search module 140; and send the appropriate decision to the interception module 110.

In one exemplary aspect, the pronouncing of the decision as to whether the script intercepted by the interception module 110 is malicious may be performed by comparing the mean of the product of at least one verdict template trust coefficient selected by the analysis module 150 and at least one degree of similarity of hash sums calculated by the hash sum calculating module 130 to an established threshold value.

In one exemplary aspect, the hash sum library 170 is configured to store at least one group constituting a set of data which includes: at least two previously calculated hash sums from the bytecode of malicious scripts, and at least one degree of similarity for at least two hash sums contained in the group.

In one exemplary aspect, the verdict template library 180 is configured to store at least one verdict template, which is a set of data that includes at least one group from the hash sum library 170; and a verdict template trust coefficient, being a numerical value.

In one exemplary aspect, the verdict templates from the verdict template library 180 may be collectively encompass all the groups from the hash sum library 170.

The operation of the above-described system for blocking the execution of scripts will be described next based on example of blocking a malicious script contained in an electronic MS Word document. The user, using a client 101, which runs an MS Word processor, makes an attempt to receive from a server 100, which runs a file manager, an electronic document c:\mydoc.docx, containing a malicious script written in the VBA language. The interception module 110, being a driver of the file manager, intercepts the script of the document being opened and sends it to the bytecode calculating module 120. The intercepting of the script is done by the driver in that driver intercepts the calls for the API functions of the operating system CreateFile, ReadFile and so on, which are responsible for receiving data from the file manager.

The bytecode calculating module 120 calculates the bytecode of the intercepted script. For this: a sequence of all script commands is selected from the intercepted script; some of the script commands not responsible for the functionality responsible for writing data to a disk, working with objects of the file system, running applications, and so forth, are removed from the selected sequence; the script commands remaining in the selected sequence are combined into groups of commands (for example, a sequence of script commands responsible for writing data to a file, running a file and deleting a file are combined into one group); each script command or group of script commands is assigned a unique two-byte value; the obtained sequence of two-byte values constitutes the calculated bytecode.

The hash sum calculating module 130 calculates from the received bytecode a fuzzy hash sum (for example, using the open-source algorithm fuzzyHash), being a set of data containing the size of the blocks into which the bytecode is broken up, and the hash sums of these blocks. After this, it sends the calculated hash sum to the search module 140.

The search module 140 makes a selection of groups of hash sums from the hash sum library 170, where a group constitutes a set of data which includes: previously calculated hash sums of the bytecode of malicious scripts, degrees of similarity between hash sums contained in the group.

In the course of the selection from the hash sum library 170, a fuzzy comparison (fuzzy searching) is performed for the hash sums of each group contained in the hash sum library 170 with the hash sum received from the hash sum calculating module 130. The result of the fuzzy comparison of two hash sums is a number in the range from 0 to 1, expressing how similar the compared hash sums are to each other and known as the degree of similarity of two hash sums (for example, the similarity of fuzzy hash sums calculated from bytecode of scripts containing 10% script commands differing from each other will be equal to 0.9). In the event that at least one hash sum of the group being compared has a degree of similarity to the one obtained from the hash sum calculating module 130 above the established threshold (for example, 0.85), it is considered that the group has been found, and the hash sum obtained from the hash sum calculating module 130 belongs to the group being compared. After this, the selected groups and the determined degrees of similarity are sent to the analysis module 150. The groups in the hash sum library 170 are also updated—the hash sum received from the hash sum calculating module 130 is added to the selected groups. This makes it possible to increase the accuracy of the search for groups for later intercepted scripts, since the updated groups contain more hash sums of malicious scripts. For the intercepted script from the file c:\mydoc.docx, groups were selected containing hash sums of scripts containing the functionality:

for group #1—writing to disk and setting file attributes (similarity 0.98);
for group #2—blocking the task manager, hiding the taskbar (similarity 0.95);
for group #3—deletion of files (similarity 0.90);
for group #4—creating a Windows window using VBA means (similarity 0.87).

The selected groups are sent to the analysis module 150.

The analysis module 150 makes a selection of verdict templates from the verdict template library 180 which templates include the groups received from the search module 140. In the selection process, it is determined which groups are contained in each verdict template of the verdict template library 180, and how similar they are to the groups received from the search module 140. The method of comparison used can be a fuzzy searching algorithm, the result of which is a number in the range from 0 to 1, characterizing how similar the sets of groups compared are to each other and known as the degree of similarity of two sets of groups. For the groups received from the search module 140, the following verdict templates were selected:

template #1 "blocker": template trust coefficient 0.1, contains groups #1 (degree of similarity 1.0). #2 (degree of similarity 1.0), #3 (degree of similarity 0.9);
template #2 "cryptor": template trust coefficient 0.3, contains groups #1 (degree of similarity 0.7). #3 (degree of similarity 1.0), #4 (degree of similarity 0.95).

The template trust coefficients of the selected verdict templates, as well as the groups selected by the search module 140, are sent to the verdict making module 160.

The verdict making module 160 selects from the received trust coefficients the minimal (0.1 for the "blocker" verdict template) degree of similarity of the hash sums in the groups contained in the selected template (0.9) and calculates the product of the trust coefficient and the degree of similarity (0.09), after which it compares the resulting value with the maximum permissible value (such as 0.2), pronounces a verdict that the intercepted script is malicious and should be blocked, and sends the decision to the interception module 110 for blocking the intercepted script. After this, the interception module 110 replaces the intercepted script with a blank script, not executing any actions and needed only for the correct operation of the Microsoft Word document, thereby blocking the intercepted script and preventing the execution of the malicious script on the computer system of the user.

Figure 2:
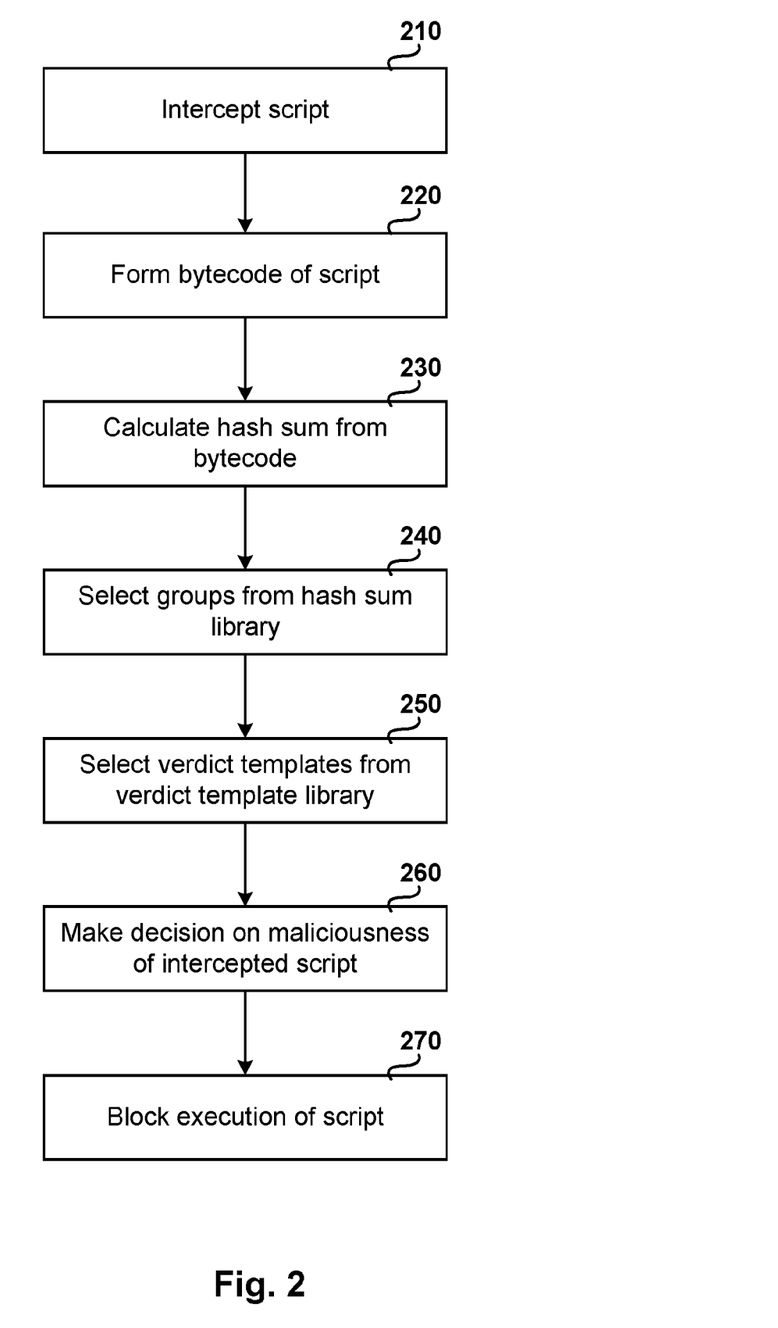
FIG. 2 illustrates a diagram of an exemplary method of blocking execution of scripts.

FIG. 2 shows a diagram of an exemplary method of blocking the execution of scripts. In step 210, at least one script requested by the client 101 from the server 100 is intercepted by the interception module 110. In step 220, the bytecode of the intercepted script is calculated by the bytecode calculating module 120. In step 230, the hash sum of the bytecode is calculated by hash sum calculation module 130. In step 240, at least one group is selected from the hash sum library 170 by selection module 140, in which group at least one hash sum has a degree of similarity with the hash sum calculated in step 130 corresponding to the established threshold of similarity. In step 250, at least one verdict template is selected from the verdict template library 180 by the analysis module 150. The template includes at least one group whose degree of similarity to at least one group selected by the search module 140 corresponds to the established threshold. In step 260, decisions are made by the verdict making module 160 as to whether the script intercepted in step 210 is malicious on the basis of at least one verdict template trust coefficient selected in step 250 and at least one hash sum degree of similarity determined in step 240. In step 270 the script intercepted in step 210 is blocked by the interception module 110 in accordance with the decision made by the verdict making module 160 as to the maliciousness of the intercepted script.

The operation of the above-described method for blocking the execution of scripts will be described next based on example of blocking a malicious script contained on the page of a website being viewed by a user using a browser. The user, via a client 101, which runs an Internet Explorer browser, makes an attempt to view a page, i.e., receive an Internet page from the server 100, being the site http://tasianits.com, which contains a malicious script, written in the JavaScript language with the use of ActiveX.

In step 210, the interception module 110 intercepts the script of the document being opened and sends it to the bytecode calculating module 120.

In step 220, the bytecode calculating module 120 calculates the bytecode of the intercepted script. For this, commands of operations connected with the operations of interacting with the computer system of the user (such as writing to a disk, and so on) are selected from the intercepted script, each selected operation is assigned a two-byte identifier (so called byte code), and a byte sequence is assembled from the resulting identifiers, which constitutes the bytecode. After this, the bytecode calculating module 120 sends the calculated bytecode to the hash sum calculation module 130.

In step 230, the hash sum calculating module 130 calculates from the received bytecode a fuzzy hash sum (for example, making use of the open-source algorithm fuzzy-Hash), being a set of data containing a number characterizing the size of the blocks into which the bytecode is broken up for computing the hash sum, and two hash sums calculated from the bytecode. After this, it sends the calculated hash sum to the search module 140.

In step 240, the search module 140 selects from the hash sum library 170 groups of hash sums. For this, a fuzzy comparison is performed for the hash sums of each group contained in the hash sum library 170 with the hash sum received from the hash sum calculating module 130. The result of the fuzzy comparison of two hash sums is a number in the range from 0 to 1, expressing how similar the compared hash sums are to each other and known as the degree of similarity of two hash sums. In the event that at least one hash sum of the group being compared has a degree of similarity with the one obtained from the hash sum calculating module 130 above the established threshold (for example, 0.5), it is considered that the group has been found, and the hash sum obtained from the hash sum calculating module 130 belongs to the group being compared. After this, the selected groups and the determined degrees of similarity are sent to the analysis module 150. The groups in the hash sum library 170 are also updated—the hash sum received from the hash sum calculating module 130 is added to the selected groups. This makes it possible to increase the effectiveness of the search for groups for later intercepted scripts. For the intercepted script from the site http://tasianits.com, groups were selected containing hash sums of scripts containing the functionality for group #1—writing to a disk and executing a file on the computer system of the user (similarity 0.7);

for group #2—set of operations utilizing the ActiveX vulnerability (similarity 1.0).

In step 250, the analysis module 150 selects verdict templates from the verdict template library 180 which include the groups received from the search module 140. For this, it determines which groups are contained in each verdict template from the verdict template library 180, and how similar they are to the groups received from the search module 150. The method of comparison used can be a fuzzy searching algorithm, the result of which is a number in the range of 0 to 1, characterizing how similar the sets of groups compared are to each other and known as the degree of similarity of two sets of groups. For the groups received from the search module 140, the following verdict templates were selected: template #1 "injector": template trust coefficient 0.0, contains groups #1 (degree of similarity 1.0), #2 (degree of similarity 1.0). The template trust coefficients of the selected verdict templates are sent to the verdict making module 160.

In step 260, the verdict making module 160 calculates on the basis of the received template trust coefficient and degree of similarity the product of the template trust coefficient (0.0) and the degree of similarity (0.85), after which it compares the resulting value with the maximum permissible value (0.15), pronounces a verdict that the intercepted script is malicious and should be blocked, and sends the decision to the interception module 110 for blocking the intercepted script.

After this, in step 270, the interception module blocks the intercepted script, thereby preventing the execution of a malicious script on the computer system of the user.

Figure 3:
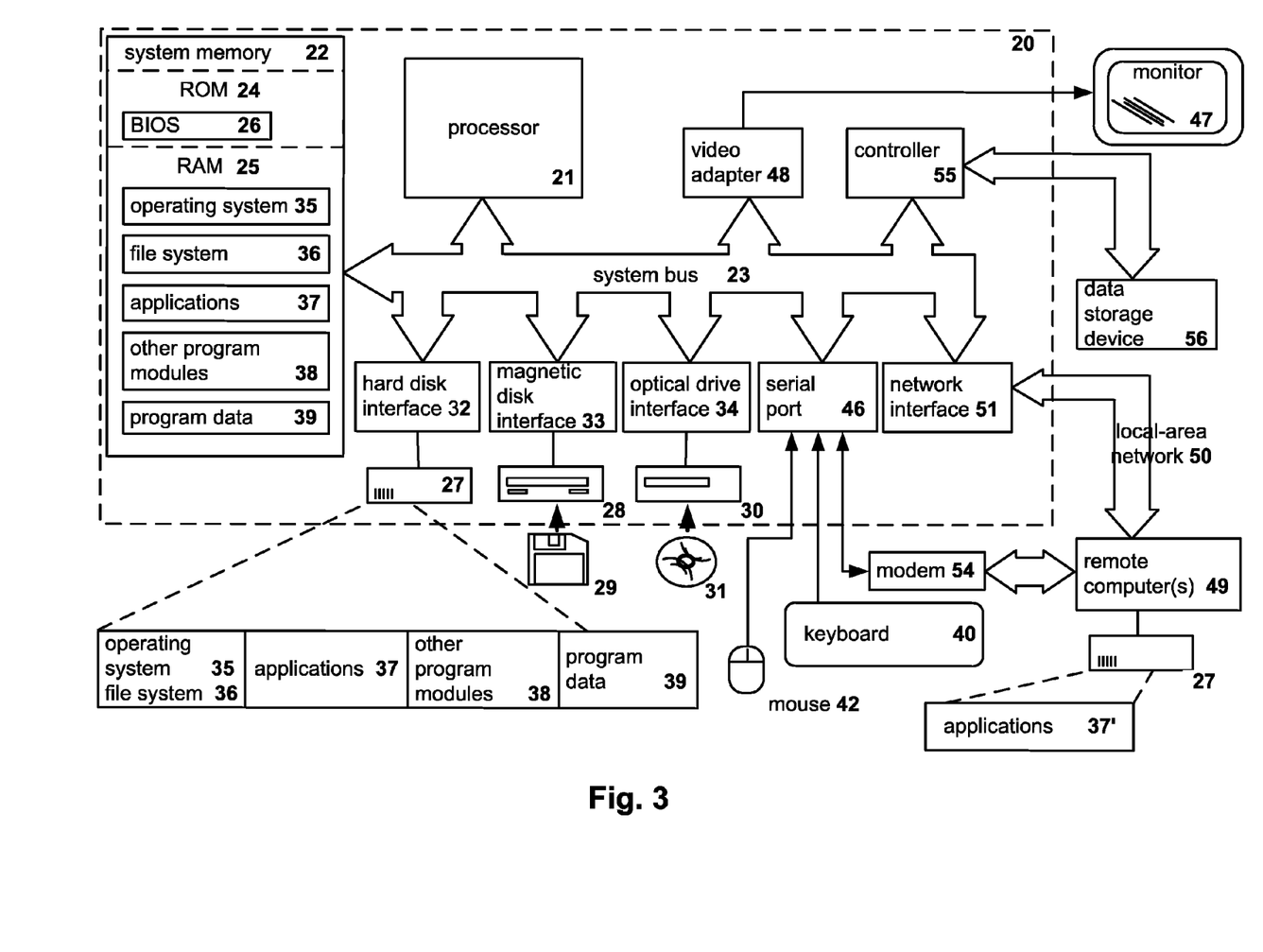
FIG. 3 illustrates an example of a computer system which can be used to implement various aspects of systems and methods of the present invention.

FIG. 3 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for blocking execution of malicious scripts, the method comprising:
intercepting, by a processor of a client, a script requested by the client from a server by providing, on the client, a driver configured to intercept network script requests by rerouting at least one transmission channel of the script from the client to the driver;
generating, by the processor, a bytecode of the intercepted script;
computing, by the processor, a hash sum of the generated bytecode;
determining, by the processor, a degree of similarity between the hash sum of the bytecode and a plurality of hash sums of malicious and clean scripts stored in a database;
identifying, by the processor, a similar hash sum from the database whose degree of similarity with the hash sum of the bytecode is within a threshold of similarity;
determining, by the processor, a coefficient of trust of the similar hash sum;
determining, by the processor, whether the requested script is malicious based on the degree of similarity and the coefficient of trust of the similar hash sum; and
blocking, by the processor, the execution of the malicious script on the client.

2. The method of claim 1, wherein the bytecode includes at least one opcode of the script.

3. The method of claim 1, wherein generating a bytecode of the script includes:
identifying script commands responsible for functions of writing of data to disk, working with objects of file system and execution of programs;
grouping the identified script commands into a plurality of functional groups based on their identified functions;
assigning a binary value to each functional group; and
generating the bytecode from the binary values.

4. The method of claim 1, wherein a hash sum includes a fuzzy hash.

5. The method of claim 1, wherein searching for matching hash sums includes fuzzy searching.

6. A system for blocking execution of malicious scripts, the system comprising:
a hardware processor of a client configured to:
intercept a script requested by the client from a server by providing, on the client, a driver configured to intercept network script requests by rerouting at least one transmission channel of the script from the client to the driver;
generate a bytecode of the intercepted script;
compute a hash sum of the generated bytecode;
determine a degree of similarity between the hash sum of the bytecode and a plurality of hash sums of malicious and clean scripts stored in a database;
identify a similar hash sum from the database whose degree of similarity with the hash sum of the bytecode is within a threshold of similarity;
determine a coefficient of trust of the similar hash sum;
determine whether the requested script is malicious based on the degree of similarity and the coefficient of trust of the similar hash sum; and
block the execution of the malicious script on the client.

7. The system of claim 6, wherein the bytecode includes at least one opcode of the script.

8. The system of claim 6, wherein generating a bytecode of the script includes:
identify script commands responsible for functions of writing of data to disk, working with objects of file system and execution of programs;
group the identified script commands into a plurality of functional groups based on their identified functions;
assign a binary value to each functional group; and
generate the bytecode from the binary values.

9. The system of claim 6, wherein a hash sum includes a fuzzy hash.

10. The system of claim 6, wherein searching for matching hash sums includes fuzzy searching.

11. A non-transitory computer readable medium storing computer executable instructions for blocking execution of malicious scripts, including instructions for:
intercepting a script requested by a client from a server by providing, on the client, a driver configured to intercept network script requests by rerouting at least one transmission channel of the script from the client to the driver;
generating a bytecode of the intercepted script;
computing a hash sum of the generated bytecode;
determining a degree of similarity between the hash sum of the bytecode and a plurality of hash sums of malicious and clean scripts stored in a database;
identifying a similar hash sum from the database whose degree of similarity with the hash sum of the bytecode is within a threshold of similarity;

determining a coefficient of trust of the similar hash sum;

determining whether the requested script is malicious based on the degree of similarity and the coefficient of trust of the similar hash sum; and blocking the execution of the malicious script on the client.

12. The non-transitory computer readable medium of claim 11, wherein the bytecode includes at least one opcode of the script.

13. The non-transitory computer readable medium of claim 11, wherein generating a bytecode of the script includes:

identifying script commands responsible for functions of writing of data to disk, working with objects of file system and execution of programs;

grouping the identified script commands into a plurality of functional groups based on their identified functions;

assigning a binary value to each functional group; and generating the bytecode from the binary values.

14. The non-transitory computer readable medium of claim 11, wherein a hash sum includes a fuzzy hash.

15. The non-transitory computer readable medium of claim 11, wherein searching for matching hash sums includes fuzzy searching.

\* \* \* \* \*